(12) United States Patent
Imamura (10) Patent No.: US 8,970,775 B2
(45) Date of Patent: Mar. 3, 2015

(54) INTERCHANGEABLE LENS CAMERA, CAMERA BODY, AND METHOD FOR DETERMINING MOUNTING OF LENS

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/306,315

(22) Filed: Jun. 17, 2014

(65) Prior Publication Data

US 2014/0293122 A1  Oct. 2, 2014

Related U.S. Application Data

(63) Continuation of application No. PCT/JP2012/083199, filed on Dec. 21, 2012.

(30) Foreign Application Priority Data

Dec. 28, 2011  (JP) ................................. 2011-289516

(51) Int. Cl.
*H04N 5/225* (2006.01)
*G03B 3/00* (2006.01)
(Continued)

(52) U.S. Cl.
CPC ............ *G03B 17/14* (2013.01); *H04N 5/23209* (2013.01); *H04N 5/2254* (2013.01); *H04N 5/23203* (2013.01)
USPC ........... 348/360; 352/142; 396/241; 396/133; 348/335

(58) Field of Classification Search
USPC .......... 348/360, 344, 350, 262, 335; 396/301, 396/323, 85, 241, 133; 352/142
See application file for complete search history.

(56) References Cited

U.S. PATENT DOCUMENTS 6,183,145 B1 * 2/2001 Aihara et al. ................. 396/529
2004/0202464 A1  10/2004 Miyasaka et al.
(Continued)

FOREIGN PATENT DOCUMENTS

| JP | 2-149073 A | 6/1990 |
| JP | 7-114087 A | 5/1995 |

(Continued)

OTHER PUBLICATIONS

International Search Report, issued in PCT/JP2012/083199, dated Apr. 2, 2013.
(Continued)

*Primary Examiner* — Sinh Tran
*Assistant Examiner* — Xi Wang
(74) *Attorney, Agent, or Firm* — Birch, Stewart, Kolasch & Birch, LLP (57) ABSTRACT

An interchangeable lens camera includes a camera body and a lens unit. The camera body includes: a body-side mount section; a mounting determination section; a body-side communication section; and a body control section. The lens unit includes a lens-side mount section and a lens-side communication section. A specific body-side signal terminal among plural body-side signal terminals of the camera body is connected to a power supply through a pull-up resistor, and a specific lens-side signal terminal, which is capable of coming into contact with the specific body-side signal terminal, among plural lens-side signal terminals of the lens unit is grounded through a pull-down resistor. The mounting determination section determines that the lens unit is mounted on the body-side mount section when resistance values of both the specific body-side signal terminal at time of non-communication and a body-side detection terminal of the camera body are at low levels.

20 Claims, 8 Drawing Sheets

(51) Int. Cl.
*G03B 7/00* (2014.01)
*G03B 3/10* (2006.01)
*G03B 17/14* (2006.01)
*H04N 5/232* (2006.01)

(56) References Cited

U.S. PATENT DOCUMENTS

2009/0167878 A1* 7/2009 Kawazoe et al. .......... 348/208.5
2010/0310245 A1* 12/2010 Honjo et al. .................. 396/85
2011/0097065 A1* 4/2011 Honjo et al. .................. 396/85
2012/0150465 A1* 6/2012 Nakashima et al. ............ 702/63
2012/0155849 A1* 6/2012 Nakashima et al. .......... 396/301

FOREIGN PATENT DOCUMENTS

JP 2004-361898 A 12/2004
JP 2005-010703 A 1/2005

OTHER PUBLICATIONS

Written Opinion of the International Search Authority, issued in PCT/JP2012/083199, dated Apr. 2, 2013.

* cited by examiner

INTERCHANGEABLE LENS CAMERA, CAMERA BODY, AND METHOD FOR DETERMINING MOUNTING OF LENS

CROSS REFERENCE TO RELATED APPLICATIONS

This application is a Continuation of PCT International Application No. PCT/JP2012/083199 filed on Dec. 21, 2012, which claims priority under 35 U.S.C §119(a) to Patent Application No. 2011-289516 filed in Japan on Dec. 28, 2011, all of which are hereby expressly incorporated by reference into the present application.

BACKGROUND OF THE INVENTION

1. Field of the Invention

The present invention relates to an interchangeable lens camera in which a lens unit is detachable from a camera body, the camera body, and a method for determining the mounting of the lens.

2. Description of the Related Art

Interchangeable lens cameras, in which a lens unit having a photographing lens is detachable from a camera body, have come into widespread use. As such interchangeable lens cameras, generally, there are a single-lens reflex camera having a reflection mirror, which reflects light incident into the lens unit and guides the light into an optical viewfinder, and a mirrorless single-lens camera in which the reflection mirror is omitted. Further, not only interchangeable lens cameras in which an imaging device is provided in a camera body, but also interchangeable lens cameras in which the imaging device is provided in a lens unit have been known.

JP1990-149073A (JP-H02-149073A) discloses a camera in which the lens unit is detachable from the camera body configured such that when a control signal for requesting an initial value is sent from the camera body to the lens unit through a communication path, the number of the lens unit is sent back from the lens unit to the camera body, and then the camera body determines that the lens unit is normally mounted on the camera body if data communication is performed normally.

JP1995-114087A (JP-H07-114087A) discloses a camera in which the lens unit is detachable from the camera body, the camera including a lens detection terminal dedicated to detection of the lens unit. In the case where the lens unit is not mounted, a resistance value of the lens detection terminal is increased (becomes a high level) by a pull-up resistor. In the case where the lens unit is mounted, the lens detection terminal is connected to a ground terminal of the camera body through the lens unit. A central processing unit (CPU) of the camera body determines whether the lens unit is mounted by detecting a change in the resistance value of the lens detection terminal from a high level, at which the resistance value is high, to a low level at which the resistance value is low.

SUMMARY OF THE INVENTION

However, it is difficult to satisfy both the prompt determination of the mounting of the lens unit and the precise determination, thereby assuring safety.

In the configuration disclosed in JP1990-149073A (JP-H02-149073A), on the basis of whether or not data communication is performed normally, it is determined whether the lens unit is mounted, and thus it takes too much time to transmit and receive data. As a result, activation of the lens unit is delayed.

In the configuration disclosed in JP1995-114087A (JP-H07-114087A), it is determined whether the lens unit is mounted, on the basis of only the level of the lens detection terminal dedicated to the detection of the lens unit, and thus there is a possibility that false detection is caused by electrical shorting or the like.

That is, as in JP1990-149073A (JP-H02-149073A), when it is determined whether the lens unit is mounted through data communication, it takes time to perform the mounting determination. As in JP1995-114087A (JP-H07-114087A), when it is determined whether the lens unit is mounted on the basis of only the level of the lens detection terminal dedicated to the detection of the lens unit, there is a problem of the precise mounting determination. Further, in the case where a form of a mount section is determined in advance, practically it is difficult to simply increase the number of lens detection terminals dedicated to the lens detection.

The present invention has been made in view of the above situation, and its object is to provide an interchangeable lens camera, a camera body, and a method for determining mounting of lens capable of promptly determining whether the lens unit is mounted and assuring precision of the determination as to whether the lens unit is mounted.

According to an aspect of the present invention, there is provided an interchangeable lens camera comprising a camera body and a lens unit. The camera body includes: a power supply; a body-side mount section configured to detachably mount the lens unit, the body-side mount section being provided with a body-side power supply terminal connected to the power supply, a body-side detection terminal dedicated to detection of the lens unit, and a plurality of body-side signal terminals for communication with the lens unit; a mounting determination section configured to determine whether the lens unit is mounted on the body-side mount section; a body-side communication section configured to communicate with the lens unit through the plurality of body-side signal terminals of the body-side mount section; and a body control section configured to control the camera body. The lens unit includes: a lens-side mount section being provided with a lens-side power supply terminal capable of coming into contact with the body-side power supply terminal of the camera body, a lens-side detection terminal capable of coming into contact with the body-side detection terminal of the body, and a plurality of lens-side signal terminals capable of respectively coming into contact with the plurality of body-side signal terminals of the camera body; and a lens-side communication section configured to communicate with the camera body through the plurality of lens-side signal terminals of the lens-side mount section. In the interchangeable lens camera, a specific body-side signal terminal among the plurality of body-side signal terminals of the camera body is connected to the power supply through a pull-up resistor, and a specific lens-side signal terminal, which is capable of coming into contact with the specific body-side signal terminal, among the plurality of lens-side signal terminals of the lens unit is grounded through a pull-down resistor. In the interchangeable lens camera, the mounting determination section of the camera body determines that the lens unit is mounted on the body-side mount section when resistance values of both the specific body-side signal terminal at time of non-communication and the body-side detection terminal of the camera body are at low levels. It should be noted that, "the resistance values are at low levels" means a range of the resistance value that can be arbitrarily set in accordance with an apparatus and a member or combination thereof. In the following description, "the resistance value is at a high level" means a range in which the resistance value is greater than the "low level" that is arbitrarily set.

According to the above aspect of the present invention, the mounting determination is performed also on the basis of a voltage of the signal terminal for communication at the time of non-communication. Hence, it is possible to promptly and precisely determine whether the lens unit is mounted, without newly and additionally providing a terminal dedicated to the lens detection.

In an embodiment, before power is applied to the lens unit through the body-side power supply terminal of the body-side mount section, the mounting determination section of the camera body may set only the body-side detection terminal as a determination target and determine whether or not the resistance value of the body-side detection terminal is at the low level. In a case where the mounting determination section of the camera body determines that the resistance value of the body-side detection terminal is at the low level, the mounting determination section may determine whether or not the resistance values of both the body-side detection terminal and the specific body-side signal terminal at the time of non-communication are at the low levels after power is applied to the lens unit through the body-side power supply terminal of the body-side mount section. Thus by using the body-side detection terminal dedicated to the mounting detection in the determination as to whether or not power is applied to the lens unit, the camera body and the lens unit are prevented from failing to operate properly.

In an embodiment, the body control section of the camera body may apply pre-power to supply weak current to the lens unit through the body-side power supply terminal of the body-side mount section, and apply main power to supply current capable of operating the lens unit to the lens unit through the body-side power supply terminal of the body-side mount section in the case where the mounting determination section of the camera body determines that both resistance values of the body-side detection terminal and the specific body-side signal terminal at the time of non-communication are at the low levels. The body control section of the camera body may stop supplying the weak current to the lens unit in the case where the mounting determination section of the camera body determines that the resistance value of the body-side detection terminal or the specific body-side signal terminal at the time of non-communication is at a high level, which is higher than the low level. Thus by applying the pre-power, while preventing overcurrent (rush current) to the lens unit from occurring, it is possible to precisely perform the mounting determination.

In an embodiment, at least one body-side signal terminal may be disposed between the body-side power supply terminal and the specific body-side signal terminal of the body-side mount section of the camera body. Accordingly, it is possible to prevent false detection and trouble from being caused by shorting between the body-side power supply terminal and the specific body-side signal terminal.

In an embodiment, at least one body-side signal terminal may be disposed between a body-side ground terminal and the specific body-side signal terminal of the body-side mount section of the camera body. Consequently, it is possible to prevent false detection and trouble from being caused by shorting between body-side ground terminal and the specific body-side signal terminal.

In an embodiment, wherein the mounting determination section may determine that the lens unit is mounted in the case where the resistance values of both the specific body-side signal terminal at the time of non-communication and the body-side detection terminal of the camera body are at the low levels, and a resistance value of a signal terminal disposed between the body-side ground terminal and the specific body-side signal terminal of the camera body is at the high level. Accordingly, it is possible to prevent false detection and trouble from occurring when a plurality of terminals from the specific body-side signal terminal to the body-side ground terminal is shorted.

In an embodiment, wherein the mounting determination section may determine that the lens unit is mounted in the case where the resistance values of both the specific body-side signal terminal at the time of non-communication and the body-side detection terminal of the camera body are at the low levels, and a resistance value of a signal terminal adjacent to the body-side ground terminal of the camera body is at the high level. Accordingly, it is possible to prevent false detection and trouble from occurring when a signal terminal adjacent to the body-side ground terminal is shorted.

In an embodiment, at least one body-side signal terminal may be disposed between the body-side detection terminal and the specific body-side signal terminal of the body-side mount section of the camera body. Accordingly, it is possible to prevent false detection and trouble from being caused by shorting between the body-side detection terminal and the specific body-side signal terminal.

In an embodiment, the mounting determination section may determine that the lens unit is mounted in the case where resistance values of both the specific body-side signal terminal at the time of non-communication and the body-side detection terminal of the camera body are at the low levels and a resistance value of a signal terminal disposed between the body-side detection terminal and the specific body-side signal terminal of the camera body is at the high level. Accordingly, it is possible to prevent false detection and trouble from occurring when a plurality of terminals from the specific body-side signal terminal to the body-side detection terminal is shorted.

In an embodiment, the mounting determination section may determine that the lens unit is mounted in the case where the resistance values of both the specific body-side signal terminal at the time of non-communication and the body-side detection terminal of the camera body are at the low levels and a resistance value of a signal terminal adjacent to the body-side detection terminal of the camera body is at the high level. Consequently, it is possible to prevent false detection and trouble from occurring when the specific body-side detection terminal and signal terminals adjacent to the specific body-side detection terminal are shorted.

In an embodiment, the mounting determination section may determine that the lens unit is mounted in the case where the resistance values of both the specific body-side signal terminal at the time of non-communication and the body-side detection terminal of the camera body are at the low levels and a resistance value of a signal terminal adjacent to the specific body-side signal terminal is at the high level. Accordingly, it is possible to prevent false detection and trouble from occurring when the specific body-side signal terminal and signal terminals adjacent to the specific body-side signal terminal are shorted.

In an embodiment, the mounting determination section of the camera body may determine that the lens unit is not mounted, regardless of whether the resistance value of the specific body-side signal terminal is at the high level or at the low level, when the resistance value of the body-side detection terminal is at the high level or when the resistance value of the body-side detection terminal is switched from the low level to the high level.

In an embodiment, the plurality of lens-side signal terminals and the plurality of body-side signal terminals for communication may include at least one of a terminal for a busy signal indicating a specific operation time period of at least one of the camera body and the lens unit, a terminal for a synchronization signal for synchronization between the camera body and the lens unit, a terminal for a serial communication signal for serial communication between the camera body and the lens unit, and a terminal for a parallel communication signal for parallel communication between the camera body and the lens unit.

In addition, a signal terminal, which is also used in the mounting determination, is a signal terminal capable of setting both the high level and the low level in order to transmit and receive (communicate) signals between the camera body and the lens unit. A specific signal terminal, which is also used in the mounting determination, may be a signal terminal which is used in one-way communication of communication from the camera body to the lens unit and communication from the lens unit to the camera body, and may also be a terminal which is used in both-way communication.

According to the present invention, it is possible to promptly determine whether the lens unit is mounted, and it is possible to assure precision of the determination result.

BRIEF DESCRIPTION OF THE DRAWINGS

FIG. 4 is a timing diagram illustrating an example of changes in voltage levels of the respective terminals when power of the camera body is turned on.

FIG. 5 is a flowchart illustrating an example of a lens mounting determination process when the power of the camera body is turned on.

DESCRIPTION OF THE PREFERRED EMBODIMENTS

Hereinafter, referring to the accompanying drawings, embodiments of the present invention will be described in detail.

Figure 1:
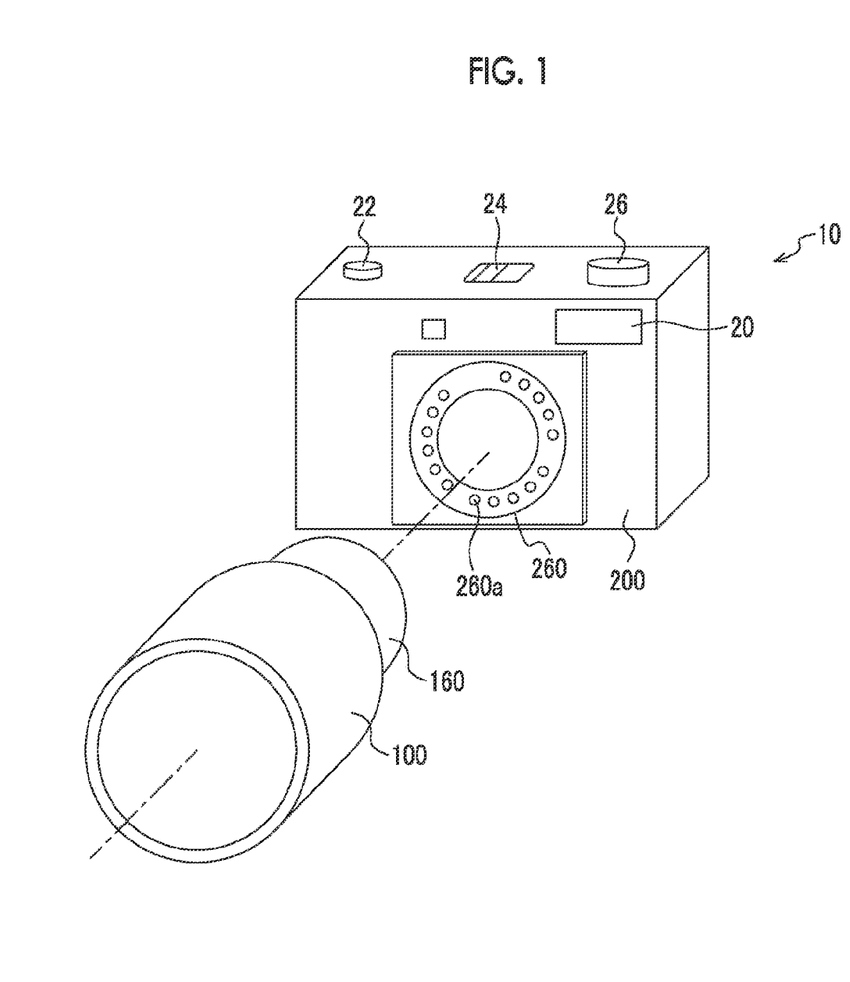
FIG. 1 is a perspective view illustrating a front appearance of an interchangeable lens camera according to an embodiment of the present invention.

FIG. 1 is a perspective view illustrating a front appearance of an interchangeable lens camera (hereinafter referred to as a "camera") according to an embodiment of the present invention.

As shown in FIG. 1, a camera 10 of the embodiment includes a lens unit 100 and a camera body 200. The lens unit 100 includes a lens mount 160 (lens-side mount section) which is detachable from a body mount 260 (body-side mount section) of the camera body 200 to be described later. The lens unit 100 of the present example has a cylindrical shape, and the lens mount 160 is formed at the end portion of the lens unit 100. The camera body 200 includes the body mount 260 from which the lens mount 160 of the lens unit 100 is detachable. The camera body 200 of the present example has a box shape, and the body mount 260 is formed substantially at the center of the front of the camera body 200. By mounting the lens mount 160 of the lens unit 100 on the body mount 260 of the camera body 200, the lens unit 100 is detachably mounted on the camera body 200.

A plurality of terminals is provided as contact points on each of the lens mount 160 and the body mount 260. Though FIG. 1 shows only terminals 260a of the body mount 260, terminals are also provided on the lens mount 160. When the lens mount 160 is mounted on the body mount 260, the terminals of the lens mount 160 and the body mount 260 come into contact with each other and are electrically connected to each other. In the present example, the plurality of terminals 260a of the body mount 260 and a plurality of terminals of the lens mount 160 are provided along the circumferential direction of the lens unit 100.

A flash 20 (built-in strobe), which illuminates a subject with illumination light, is provided on the front surface of the camera body 200. A release button 22, a power switch 24, and a dial 26 are provided on the upper surface of the camera body 200. Further, various buttons and a monitor (216 in FIG. 2) to be described later are provided on the rear surface of the camera body 200 which is not shown.

The release button 22 is configured to function as photography instruction input means, which is for inputting a photography instruction, and to operate in a way of two steps of so-called "half pressing" and "full pressing". In the camera 10, automatic exposure (AE) and auto focus (AF) function through the half pressing of the release button 22, and photography is performed through the full pressing.

In the present example, the power switch 24 is constituted by, for example, a slide switch, and the power of the camera body 200 is turned on/off through a slide operation of the power switch 24. It should be noted that the power switch 24 is not limited to the slide operation type, and the location where the switch is disposed is not limited. For example, the switch may be disposed on the rear surface of the camera body 200.

The dial 26 is a rotational operation member, and functions as means for switching modes of the camera 10. The camera 10 can be set in a "photography mode" of capturing an image of a subject and recording the image of the subject, and a "reproduction mode" of reproducing the recorded image, through the rotational operation of the dial 26.

Figure 2:
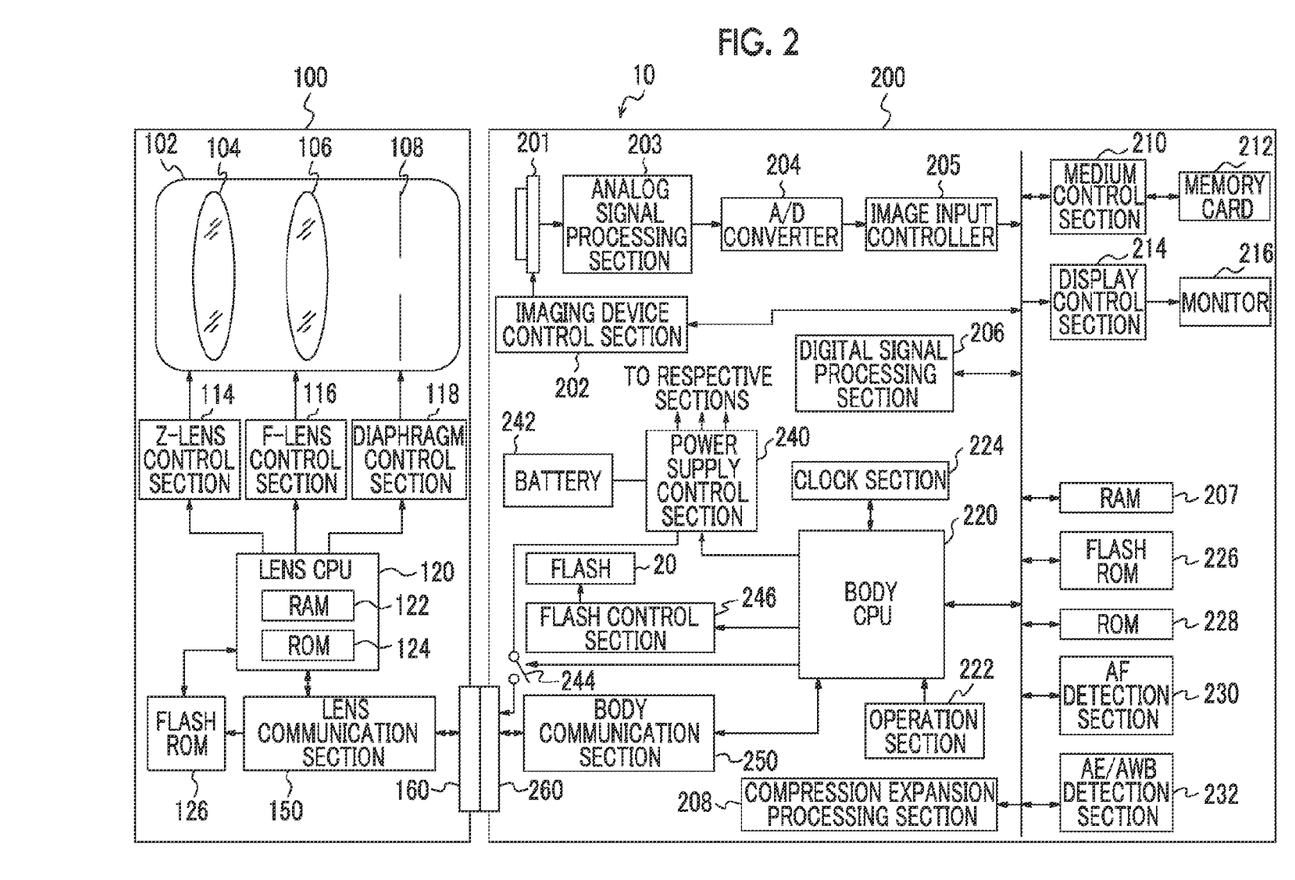
FIG. 2 is a block diagram illustrating a configuration of the entirety of the interchangeable lens camera of FIG. 1.

FIG. 2 is a block diagram illustrating a configuration of the entirety of the camera 10.

The lens unit 100 includes a photography optical system 102 (a zoom lens 104, a focus lens 106, and a diaphragm 108), a zoom lens control section 114, a focus lens control section 116, a diaphragm control section 118, a lens CPU 120, a flash read-only memory (ROM) 126, a lens communication section 150 (lens-side communication section), and the lens mount 160 (lens-side mount section).

The photography optical system 102 has the zoom lens 104, the focus lens 106, and the diaphragm 108. The zoom lens control section 114 controls a position of the zoom lens 104 in accordance with a command issued from the lens CPU 120. The focus lens control section 116 controls a position of the focus lens 106 in accordance with a command issued from the lens CPU 120. The diaphragm control section 118 controls an aperture area of the diaphragm 108 in accordance with a command issued from the lens CPU 120.

The lens CPU 120 is a central processing unit (CPU) of the lens unit 100, and has a ROM 124 and a RAM 122 incorporated therein.

The flash ROM 126 is a nonvolatile memory in which programs and the like downloaded from the camera body 200 are stored.

The lens CPU 120 controls the respective sections of the lens unit 100 by using the RAM 122 as a working area in accordance with a control program stored in the ROM 124 or the flash ROM 126.

The lens communication section 150 communicates with the camera body 200 through a plurality of signal terminals (lens-side signal terminals), which are provided on the lens mount 160, to be described later, in a state where the lens mount 160 is mounted on the body mount 260 of the camera body 200.

The camera body 200 includes an imaging device (MOS type or CCD type) 201, an imaging device control section 202, an analog signal processing section 203, an A/D converter 204, an image input controller 205, a digital signal processing section 206, a RAM 207, a compression expansion processing section 208, a medium control section 210, a memory card 212, a display control section 214, a monitor 216, a body CPU 220 (body control section), an operation section 222, a clock section 224, a flash ROM 226, a ROM 228, an AF detection section 230, an AE/AWB detection section 232, a power supply control section 240, a battery 242 (power supply), a flash control section 246, a body communication section 250 (lens-side communication section), and the body mount 260 (body-side mount section).

The imaging device 201 is constituted by an image sensor that captures an image of a subject. An optical image of the subject, which is formed on a light receiving surface of the imaging device 201 by the photography optical system 102 of the lens unit 100, is converted into an electric signal by the imaging device 201. Examples of the imaging device 201 include a metal oxide semiconductor (MOS) type image sensor, and a charge coupled device (CCD) type image sensor.

The imaging device control section 202 controls imaging timing, an exposure time period, and the like of the imaging device 201 in accordance with a command of the body CPU 220.

The analog signal processing section 203 performs various analog signal processes on an analog image signal which can be obtained by capturing an image of a subject through the imaging device 201. The analog signal processing section 203 of the present example is configured to include a sampling hold circuit, a color separation circuit, a gain adjustment circuit, and the like.

The A/D converter 204 converts the analog image signal, which is output from the analog signal processing section 203, into a digital image signal.

The image input controller 205 temporarily stores the digital image signal, which is output from the A/D converter 204, as image data in the RAM 207. In addition, when the imaging device 201 is a MOS type imaging device, the A/D converter 204 is mostly built into the imaging device 201.

The digital signal processing section 206 performs various digital signal processes on the image data which is stored in the RAM 207. The digital signal processing section 206 of the present example is configured to include a luminance and color difference signal generation circuit, a gamma correction circuit, a sharpness correction circuit, a contrast correction circuit, a white balance correction circuit, and the like.

The compression expansion processing section 208 performs a compressing process on uncompressed image data which is stored in the RAM 207. Further, the compression expansion processing section 208 performs an expanding process on the compressed image data.

The medium control section 210 performs control to record the image data, which is compressed through a compression expansion processing section 208, in the memory card 212.

Further, the medium control section 210 performs control to read the compressed image data from the memory card 212.

The display control section 214 performs control to display the uncompressed image data, which is stored in the RAM 207, on the monitor 216.

The monitor 216 is constituted by, for example, a display device such as a liquid crystal display device or an organic EL display device.

When a live view image is displayed on the monitor 216, the digital image signal, which is continuously generated by the digital signal processing section 206, is temporarily stored in the RAM 207. The display control section 214 converts the digital image signal, which is temporarily stored in the RAM 207, into a signal format for display, and sequentially outputs the signal to the monitor 216. Thereby, the captured image is displayed on the monitor 216 in real time, and thus it is possible to perform photography while using the monitor 216 as an electronic viewfinder.

When the image of the subject is captured and recorded, through half pressing of the release button 22, under the control of the body CPU 220, the AE control and AF control are performed, and photography is performed through full pressing. The image, which is acquired by image capturing, is compressed in a predetermined compression format (for example, the JPEG format) in the compression expansion processing section 208. The compressed image data is formed as an image file to which necessary sub-information such as a time and a date of photography and a photography condition is added. Thereafter, the image data is stored in the memory card 212 through the medium control section 210.

The body CPU 220 integrally controls operations of the entire camera 10. Further, the body CPU 220 constitutes a mounting determination section, which determines whether or not the lens unit 100 is mounted on the body mount 260. The lens mounting determination process performed by the body CPU 220 will be described in detail later.

The operation section 222 is configured to include the release button 22, the power switch 24, and the dial 26 shown in FIG. 1. The body CPU 220 controls the respective sections of the camera 10, on the basis of the input from the operation section 222 or the like.

The clock section 224 measures a time period, on the basis of a command issued from the body CPU 220 through a timer. Further, the clock section 224 measures the present date and time through a calendar.

The flash ROM 226 is a readable and recordable nonvolatile memory, and stores setting information.

In the ROM 228, various kinds of data necessary for control and the control program executed by the body CPU 220 are recorded. The body CPU 220 controls the respective sections of the camera 10 while using the RAM 207 as a working area in accordance with the control program stored in the ROM 228.

The AF detection section 230 calculates a numerical value necessary for the auto focus (AF) control, on the basis of the digital image signal. In a case of so-called contrast AF, for example, a value of summation (focus evaluation value) of a high-frequency wave component of a G signal in a predetermined AF area is calculated. The body CPU 220 moves the focus lens 106 to a position at which the focus evaluation value is maximized. In addition, the AF is not limited to the contrast AF. For example, a phase difference type AF may be performed.

The AE/AWB detection section 232 calculates numerical values necessary for auto exposure (AE) control and auto white balance (AWB) control, on the basis of the digital image signal. The body CPU 220 calculates brightness (subject luminance) of the subject on the basis of the numerical values obtained from the AE/AWB detection section 232, and determines a diaphragm value and a shutter speed on the basis of a flowchart of a predetermined program.

The power supply control section 240 applies a power supply voltage, which is supplied from the battery 242, to the respective sections of the camera body 200, in accordance with the command of the body CPU 220. Further, the power supply control section 240 applies the power supply voltage, which is supplied from the battery 242, to the respective sections of the lens unit 100 through the body mount 260 and the lens mount 160, in accordance with the command of the body CPU 220. Further, the power supply control section 240 adjusts an amount of current (an amount of current when pre-power is applied and an amount of current when main power is applied) which is applied to the lens unit 100, in accordance with the command of the body CPU 220.

A lens power switch 244 switches on and off the power supply voltage which is applied to the lens unit 100 through the body mount 260 and the lens mount 160, in accordance with the command of the body CPU 220.

The flash control section 246 controls light emission of the flash 20, in accordance with the command of the body CPU 220.

The body communication section 250 transmits and receives (communicates) signals to and from the lens communication section 150 of the lens unit 100 connected thereto through the body mount 260 and the lens mount 160, in accordance with the command of the body CPU 220. On the other hand, the lens communication section 150 transmits and receives (communicates) signals to and from the body communication section 250 of the camera body 200 connected thereto through the lens mount 160 and the body mount 260, in accordance with the command of the lens CPU 120.

Example of Mount Section

Figure 3:
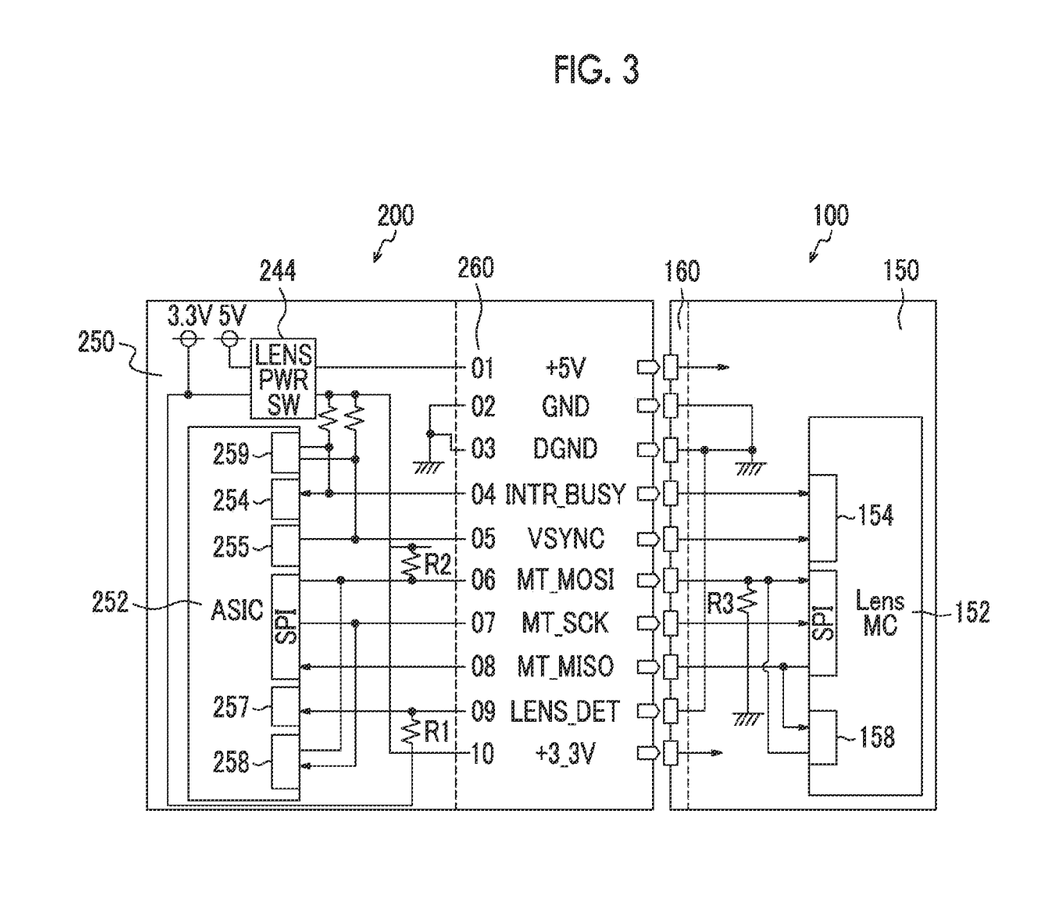
FIG. 3 is an explanatory diagram illustrating a body mount (body-side mount section), a lens mount (lens-side mount section), and peripheral sections thereof.

FIG. 3 shows the body mount 260, the lens mount 160, and peripheral sections thereof. In a state where the lens mount 160 is mounted on the body mount 260, a plurality of terminals (in the present example, 10 terminals of the number "01" to the number "10" of FIG. 3) of the body mount 260 respectively come into direct contact with a plurality of terminals of the lens mount 160.

The first terminal (+5 V terminal) of the body mount 260 is a first body-side power supply terminal for applying a voltage of +5 V of the battery 242 from the camera body 200 to the lens unit 100. The first terminal (+5 V terminal) of the body mount 260 is connected to the power supply control section 240 and the battery 242 through the lens power switch 244.

The second terminal (GND terminal) and the third terminal (DGND terminal) of the body mount 260 are body-side ground terminals for applying 0 V (ground voltage) from the camera body 200 to the lens unit 100. The second terminal and third terminal are connected to the ground of the camera body 200.

The fourth to eighth terminals of the body mount 260 are a plurality of body-side signal terminals for signal transmission and reception (communication) to and from the lens unit 100.

The fourth terminal (INTR_BUSY signal terminal) of the body mount 260 is a body-side signal terminal for giving a notification of a time period of a specific operation of the lens unit 100 from the lens unit 100 to the camera body 200. By using the fourth terminal, the notification of the time period of the specific operation of the camera body 200 may be given from the camera body 200 to the lens unit 100. In the present example, the high level (high potential) indicates that no operation is in progress, and the low level (low potential) indicates that an operation is in progress (busy state).

The fifth terminal (VSYNC signal terminal) of the body mount 260 is a body-side signal terminal for synchronization between the camera body 200 and the lens unit 100.

The sixth terminal (MT_MOSI signal terminal), the seventh terminal (MT_SCK signal terminal), and the eighth terminal (MT_SIMO signal terminal) of the body mount 260 are body-side signal terminals for serial communication between the camera body 200 and the lens unit 100. The MT_MOSI signal is output from the camera body 200 as a master, and is input to the lens unit 100 as a slave. The MT_SCK signal is a clock signal which is given from the camera body 200 as a master to the lens unit 100 as a slave. The MT_SIMO signal is output from the lens unit 100 as a slave, and is input to the camera body 200 as a master.

The ninth terminal (LENS_DET terminal) of the body mount 260 is a body-side terminal dedicated to detection of the lens unit 100. In the present example, the high level (high potential) indicates that the LENS_DET terminal of the body mount 260 is not in direct contact with the LENS_DET terminal of the lens mount 160 (unmounted state), and the low level (low potential) indicates that the LENS_DET terminal of the body mount 260 is in direct contact with the LENS_DET terminal of the lens mount 160 (mounted state).

The tenth terminal (+3.3 V terminal) of the body mount 260 is a second body-side power supply terminal for applying a voltage of +3.3 V of the battery 242 from the camera body 200 to the lens unit 100.

The ninth terminal (LENS_DET terminal) of the body mount 260 is connected to the power supply control section 240 and the battery 242 through a first pull-up resistor R1. Further, among the plurality of signal terminals (fourth to eighth terminals) for signal transmission and reception (communication) of the body mount 260, the sixth terminal (MT_MOSI signal terminal) is connected to the power supply control section 240 and the battery 242 through a second pull-up resistor R2 and the lens power switch 244. In the present example, the resistance values of the first pull-up resistor R1 and the second pull-up resistor R2 are 220 kiloohms.

Since the second pull-up resistor R2 is connected to the lens power switch 244, in a state where the lens power switch 244 is turned off (in a state where power is not applied to the lens unit 100), the sixth terminal (MT_MOSI signal terminal) is not pulled up. In a state where the lens power switch 244 is turned on by the body CPU 220 (in a state where power is applied to the lens unit 100), the sixth terminal (MT_MOSI signal terminal) is pulled up. In other words, just by turning on the power switch 24 of the camera body 200, the voltage of the sixth terminal (MT_MOSI signal terminal) of the lens unit 100 does not become the high level. However, at the beginning the lens power switch 244 is turned on by the body CPU 220, the voltage of the sixth terminal (MT_MOSI signal terminal) of the lens unit 100 becomes the high level. Thereby, a lens MC 152 (integrated circuit) on the lens unit 100 side is prevented from malfunctioning.

The body CPU 220 (mounting determination section) of the camera body 200 sets only the ninth terminal (LENS_DET terminal) as a determination target before the pre-power is applied to the lens unit 100 through the body-side power supply terminals of the body mount 260, and determines whether or not the ninth terminal (LENS_DET terminal) is at the low level. If the LENS_DET terminal is at the low level in the determination, after the pre-power is applied to the lens unit 100 through the body-side power supply terminals of the body mount 260, it is determined whether or not both of the LENS_DET terminal and the sixth terminal (MT_MOSI signal terminal) at the time of non-communication are at the low levels.

The ninth terminal (LENS_DET terminal) of the lens mount 160 is connected to the ground (GND terminal and DGND terminal). Further, among the plurality of signal terminals (fourth to eighth terminals) of the lens mount 160, the sixth terminal (MT_MOSI signal terminal) is connected to the ground through a pull-down resistor R3 (in the present example, 47 kiloohms) which has a resistance value sufficiently smaller than that of the pull-up resistor R2.

The body CPU 220 determines, as a mounting determination section, whether or not the lens mount 160 is mounted on the body mount 260 (that is, determines whether or not the lens unit 100 is mounted on the camera body 200), on the basis of a voltage (high/low level) of the specific body-side signal terminal (in the present example, the MT_MOSI signal terminal) at the time of non-communication and a voltage (high/low level) of the ninth terminal (LENS_DET terminal) of the body mount 260. Specifically, the body CPU 220 determines that the lens unit 100 is mounted on the body mount 260 if both the voltage of the MT_MOSI signal terminal at the time of non-communication and the voltage of the LENS_DET terminal of the camera body 200 are at the low levels.

Further, the lens CPU 120 may determine whether or not the lens mount 160 is mounted on the body mount 260 (that is, determine whether or not the lens unit 100 is mounted on the camera body 200), on the basis of a voltage (high/low level) of the specific lens-side signal terminal (in the present example, the MT_MOSI signal terminal) at the time of non-communication and a voltage (high/low level) of the ninth terminal (LENS_DET terminal) of the lens mount 160. Specifically, the lens CPU 120 determines that the lens unit 100 is mounted on the body mount 260 if both the voltage of the MT_MOSI signal terminal at the time of non-communication and the voltage of the LENS_DET terminal of the lens unit 100 are at the low levels.

In the example shown in FIG. 3, at least one signal terminal is disposed between the power supply terminals (+5 V terminal, and +3.3 V terminal) and the MT_MOSI signal terminal (specific body-side signal terminal) of the body mount 260. Further, at least one signal terminal is disposed between the ground terminals GND and DGND and the MT_MOSI signal terminal (specific body-side signal terminal) of the body mount 260. Furthermore, at least one signal terminal is disposed between the LENS_DET terminal dedicated to lens detection and the MT_MOSI signal terminal (specific body-side signal terminal) of the body mount 260. The MT_MOSI signal terminal, which is used in the mounting determination in such a manner, is disposed at a position separated from the terminals dedicated to power supply terminal, ground terminal, and lens detection. Thereby, false detection is prevented from being caused by electrical shorting and the like, and thus it is possible to further improve precision of the mounting determination.

The body CPU 220 may determine that the lens unit 100 is mounted if both the MT_MOSI signal terminal at the time of non-communication and the LENS_DET terminal of the body mount 260 are at the low levels and if the signal terminals (the INTR_BUSY signal terminal and the VSYNC signal terminal), which are disposed between the ground terminals (the GND terminal and the DGND terminal) and the MT_MOSI signal terminal of the body mount 260, are at the high levels.

Further, the body CPU 220 may determine that the lens unit 100 is mounted if both the MT_MOSI signal terminal at the time of non-communication and the LENS_DET terminal of the body mount 260 are at the low levels and if the signal terminal (INTR_BUSY signal terminal) adjacent to the ground terminals (GND and DGND terminals) of the body mount 260 is at the high level.

Furthermore, the body CPU 220 may determine that the lens unit 100 is mounted if both the MT_MOSI signal terminal at the time of non-communication and the LENS_DET terminal of the body mount 260 are at the low levels and if the signal terminals (the MT_SCK signal terminal and the MT_MISO signal terminal) disposed between the LENS_DET terminal and the MT_MOSI signal terminal of the body mount 260 are at the high levels.

Moreover, the body CPU 220 may determine that the lens unit 100 is mounted if both the MT_MOSI signal terminal at the time of non-communication and the LENS_DET terminal of the body mount 260 are at the low levels and if the signal terminal (MT_MISO signal terminal) adjacent to the LENS_DET terminal of the body mount 260 is at the high level.

In addition, the body CPU 220 may determine that the lens unit 100 is mounted if both the MT_MOSI signal terminal at the time of non-communication and the LENS_DET terminal of the body mount 260 are at the low levels and if the signal terminals (the VSYNC signal terminal and the MT_SCK signal terminal) adjacent to the MT_MOSI signal terminal of the body mount 260 are at the high levels.

An ASIC 252 (integrated circuit) constituting the body communication section 250 includes: a terminal 254 for detecting the change (high/low) in the electric potential (voltage) of the fourth terminal (INTR_BUSY signal terminal) of the body mount 260; a terminal 255 for giving the synchronization signal to the fifth terminal (VSYNC signal terminal) of the body mount 260; an interface SPI for serial communication using the sixth to eighth terminals (signal terminals for serial communication) of the body mount 260; a terminal 257 for detecting the change (high/low) in the electric potential of the ninth terminal (LENS_DET terminal) of the body mount 260; and terminals 258 and 259 for updating firmware of the lens unit 100.

The lens MC 152 (integrated circuit) constituting the lens communication section 150 includes: a terminal 154 for detecting the change (high/low) in the electric potential of the fourth terminal (INTR_BUSY signal terminal) of the lens mount 160; an interface SPI for serial communication using the sixth to eighth lens-side terminals (signal terminals for serial communication) of the lens mount 160; and a terminal 158 for updating firmware of the lens unit 100.

Example of Lens Mounting Determination Process

Figure 4:
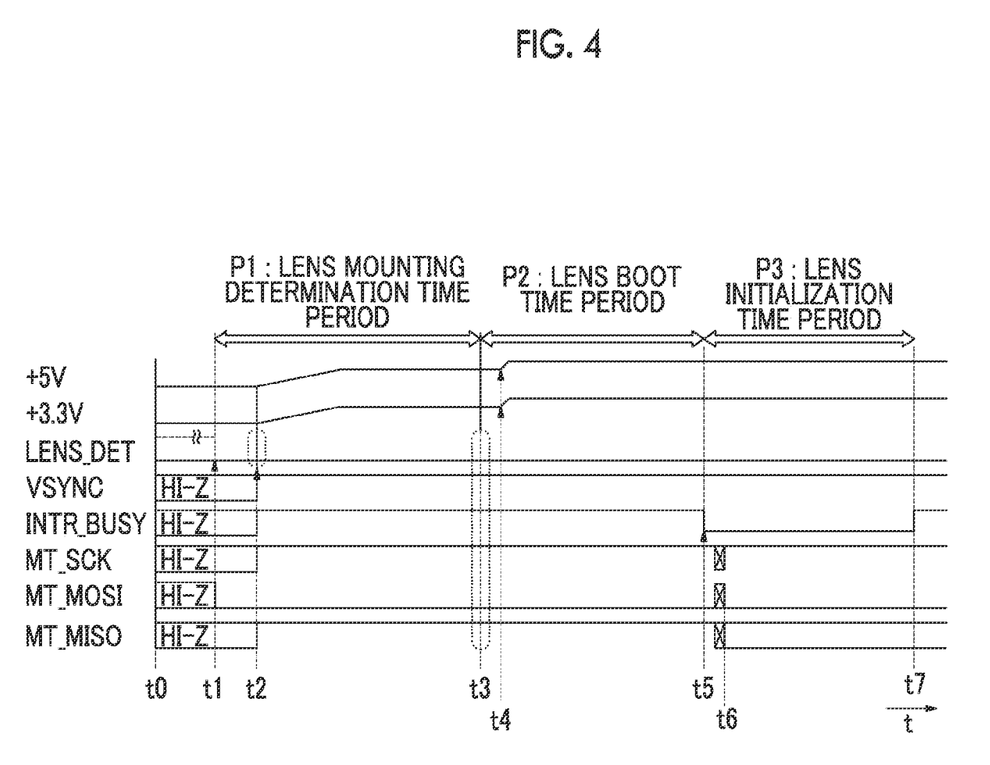

FIG. 4 is a timing diagram illustrating an example of changes in voltage levels of the ports of the ASIC 252 corresponding to the voltage levels of the respective terminals of the body mount 260 when power of the camera body 200 is turned on. In the lens mounting determination time period P1 (t1 to t3) shown in FIG. 4, the body CPU 220 performs the lens mounting determination process. At t2 of P1, under the control of the body CPU 220, the pre-power for supplying weak current is applied (soft start) from the battery 242 to the lens unit 100 through the body-side power supply terminals (+5 V terminal, and +3.3 V terminal). The weak current, which is applied to the pre-power, is smaller than the current which is supplied to the lens unit 100 by applying main power to be described later (for example, several tens of mA). By applying the pre-power, electric charge is gradually applied to a capacitor (not shown in the drawing) which is provided on the lens unit 100 side.

After a predetermined time period has passed, if it is determined that the lens unit 100 is mounted, it is possible to switch from pre-power application to main power application. That is, under the control of the body CPU 220, the main power for supplying current (for example, 1 A) capable of operating the lens unit 100 is applied from the battery 242 to the lens unit 100 through the body-side power supply terminals (+5 V terminal, and +3.3 V terminal).

In addition, in FIG. 4, in order to visually and easily understand the pre-power application (start at t2) and the main power application (start at t4), for convenience of description, the voltages of the body-side power supply terminals (+5 V terminal, and +3.3 V terminal) are shown in two steps. However, practically, the target voltages, which are reached by the weak current through the pre-power application, are equal to the voltages (+5 V, and 3.3 V) of the main power application.

By applying the main power, the lens boot time period P2 (t3 to t5) is started. Then, when boot (system boot) of the lens unit 100 is completed, the lens initialization time period P3 (t5 to t7) is started. In the period, in a state where the main power voltages (+5 V, and +3.3 V) are supplied to the lens unit 100 through the body-side power supply terminals (+5 V terminal, and +3.3 V terminal), the body CPU 220 communicates with the lens unit 100 through the signal terminals (the MT_SCK signal terminal, the MT_MOSI signal terminal, the MT_MISO signal terminal, the INTR_BUSY signal terminal, and the VSYNC signal terminal).

Figure 5:
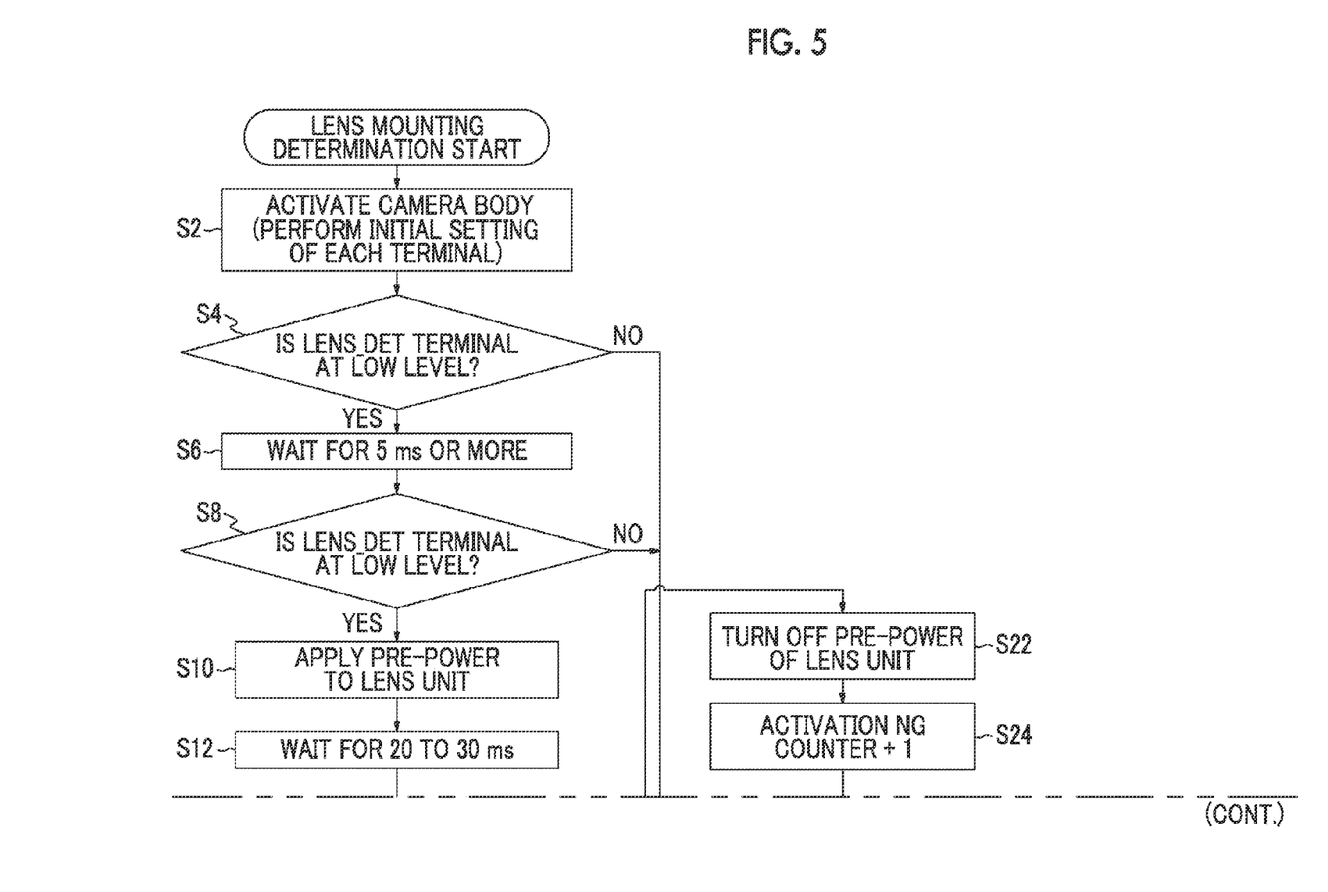

FIG. 5 is a flowchart illustrating an example of the lens mounting determination process when the power of the camera body 200 is turned on. The lens mounting determination process is performed by the body CPU 220 of the camera body 200 in accordance with a program. Hereinafter, referring to FIG. 5, an example of the lens mounting determination process, which is performed when the power of the camera body 200 is turned on, will be described.

When the power of the camera body 200 is turned on by the power switch 24 (t0 of FIG. 4), the body CPU 220 executes a process of activating the camera body 200 (step S2). In step S2, the body CPU 220 performs initial setting of each terminal of the body mount 260. The body CPU 220 of the present example turns off the lens power switch 244 (pre-power off and the main power off), and simultaneously sets ports of the ASIC 252 to high impedances (Hi-Z). The ports respectively correspond to the INTR_BUSY signal terminal, the VSYNC signal terminal, the MT_SCK signal terminal, the MT_MOSI signal terminal, and the MT_MISO signal terminal of the body mount 260.

In addition, when the lens mount 160 is not mounted on the body mount 260, the voltage of the LENS_DET terminal of the body mount 260 is set to a high level through the first pull-up resistor R1 of the camera body 200. When the lens mount 160 is mounted on the body mount 260, the LENS_DET terminal of the body mount 260 is electrically connected to the ground (GND) through the terminals of the lens unit 100, and the voltage thereof is set to a low level.

In addition, when the lens mount 160 is not mounted on the body mount 260, if the power of the lens is applied, the voltage of the MT_MOSI signal terminal of the body mount 260 is set to the high level through the second pull-up resistor R2 of the camera body 200. When the lens mount 160 is mounted on the body mount 260, the voltage of the MT_MOSI signal terminal of the body mount 260 is set to the low level through the pull-down resistor R3 of the lens unit 100 which has a resistance value sufficiently smaller than the pull-up resistor R2.

At t1 of FIG. 4, the body CPU 220 determines whether or not the LENS_DET terminal of the body mount 260 is at the low level (step S4). If the LENS_DET terminal is at the low level, the body CPU 220 waits for 5 ms or more as delay for static determination of chattering by using the clock section 224 (step S6), and determines again whether or not the LENS_DET terminal of the body mount 260 is at the low level (step S8).

If yes in steps S4 and S8 (that is, if the LENS_DET terminal is at the low level for 5 ms or more), at t2 of FIG. 4, the body CPU 220 applies the pre-power through the lens power switch 244 (step S10). Through the application of the pre-power, the power supply voltage increases up to the voltage level at which the polarities of the signal terminals can be determined when the lens is mounted. Further, the ports of the ASIC 252 are at the high levels. The ports respectively correspond to the INTR_BUSY signal terminal, the VSYNC signal terminal, the MT_SCK signal terminal, and the MT_MISO signal terminal of the body mount 260.

After the pre-power application, the body CPU 220 waits for 20 to 30 ms by using the clock section 224 in order to determine the voltage levels of the signal terminals (step S12).

At t3 of FIG. 4, the body CPU 220 determines whether or not the MT_MOSI signal terminal and the LENS_DET terminal of the body mount 260 are at the low levels at the same time (step S14). The body CPU 220 of the present example determines the levels of the LENS_DET terminal and the MT_MOSI signal terminal, and simultaneously checks whether or not the ports of the ASIC 252 are at the high levels. The ports respectively correspond to the INTR_BUSY signal terminal, the VSYNC signal terminal, the MT_SCK signal terminal, and the MT_MISO signal terminal.

If both the LENS_DET terminal and the MT_MOSI signal terminal are at the low levels, it is determined that the lens unit 100 is mounted, and the process advances to step S16. If at least one terminal between the LENS_DET terminal and the MT_MOSI signal terminal is at the high level, it is determined that the lens unit 100 is not mounted, and the process advances to step S22.

If it is determined that the lens is mounted in step S14, the body CPU 220 starts detecting the high level edge (the edge of the change from the low level to the high level) of the LENS_DET terminal (step S16). The body CPU 220 of the present example enables interrupt. The interrupt is for detecting the high level edge of the LENS_DET terminal through the ASIC 252.

Next, the body CPU 220 clears an activation NG counter (step S18). Thereby, the lens mounting determination process is completed.

When the lens mounting determination process is completed, the body CPU 220 starts the lens boot process, and applies the main power of the lens unit 100 through the lens power switch 244 (in step S20, at t4 of FIG. 4). Through the application of the main power, an amount of current capable of the lens operation and various signal processes performed by the lens unit 100 is secured.

Further, the body CPU 220 performs setting at the time of communication of each signal terminal. Specifically, the interrupt for detecting the low level edge (the edge of the change from the high level to the low level) of the INTR_BUSY signal is enabled, setting of the output of the VSYNC signal is performed, and initial setting of the interface SPI for serial communication of the ASIC 252 is performed.

When initial position driving for moving various lenses of the lens unit 100 to the initial setting position through the lens CPU 110 is started, the lens communication section 150 changes the INTR_BUSY signal from the high level to the low level.

Next, a description will be given of the process in the case where it is determined that the lens unit 100 is not mounted when the power of the camera body 200 is turned on.

If it is determined in step S4 or S8 that the LENS_DET terminal is at the low level (low potential), the body CPU 220 changes the operation mode to a lens-unmounted mode (step S28), and the process advances to a sequence of lens power off (step S36).

Further, if it is determined in step S14 that the lens unit 100 is not mounted, the body CPU 220 turns off the lens power switch 244, and turns off the pre-power applied to the lens unit 100 (step S22).

Next, the body CPU 220 increments the activation NG counter (step S24), and determines whether or not the activation NG counter is greater than a threshold value (in the present example, "2") (step S26).

If the activation NG counter is equal to or less than the threshold value, the body CPU 220 changes the operation mode to the lens-unmounted mode (step S28), and the process advances to the sequence of lens power off (step S34).

If the activation NG counter is greater than the threshold value, the body CPU 220 outputs an error message to the monitor 216 through the display control section 214 (step S30), records an error log in the flash ROM 226 (step S32), and clears the activation NG counter (step S34), and the process advances to the sequence of lens power off (step S36).

As the error message, for example, the following display is performed: "please, check the lens". The error message output may be an audio output. As the error log, for example, the following is recorded: "timeout error of lens boot start".

Next, in the lens initialization time period P3 of FIG. 4, the process performed by the body CPU 220 will be described.

The body CPU 220 monitors whether or not there is an interrupt of the low level edge of the INTR_BUSY signal by using the timer of the clock section 224. Due to the trouble of the lens unit 100, the INTR_BUSY signal may not be changed from the high level to the low level even when a regular time period (for example 200 ms) has passed from the time of the main power on. In this case, the body communication section 250 stops supplying the power to the +5 V power supply terminal and the 3.3 V power supply terminal of the body mount 260 by turning off the lens power switch 244, and records the error log as the timeout error of the lens system boot in the flash ROM 226.

When detecting the low edge (the change from the high level to the low level) of the INTR_BUSY signal by the interrupt in the regular time period from the main power on, the body communication section 250 transmits a NOP command to the lens communication section 150, through the MT_MOSI signal for serial communication. The lens communication section 150, which receives the NOP command, transmits a NOP response to the body communication section 250 through the MT_MISO signal for serial communication. If the NOP response is "OK", the body communication section 250 further performs serial communication with the lens communication section 150, and acquires the lens ID and the serial number. If the NOP response is "NG", the body communication section 250 determines the result as a communication error, and performs a communication error return process.

Further, when the initial process of the lens unit 100 ends, the lens communication section 150 changes the INTR_BUSY signal from the low level to the high level (t7 of FIG. 4). The body communication section 250 detects the high edge (the change from the low level to the high level) of the INTR_BUSY signal through the interrupt.

Figure 6:
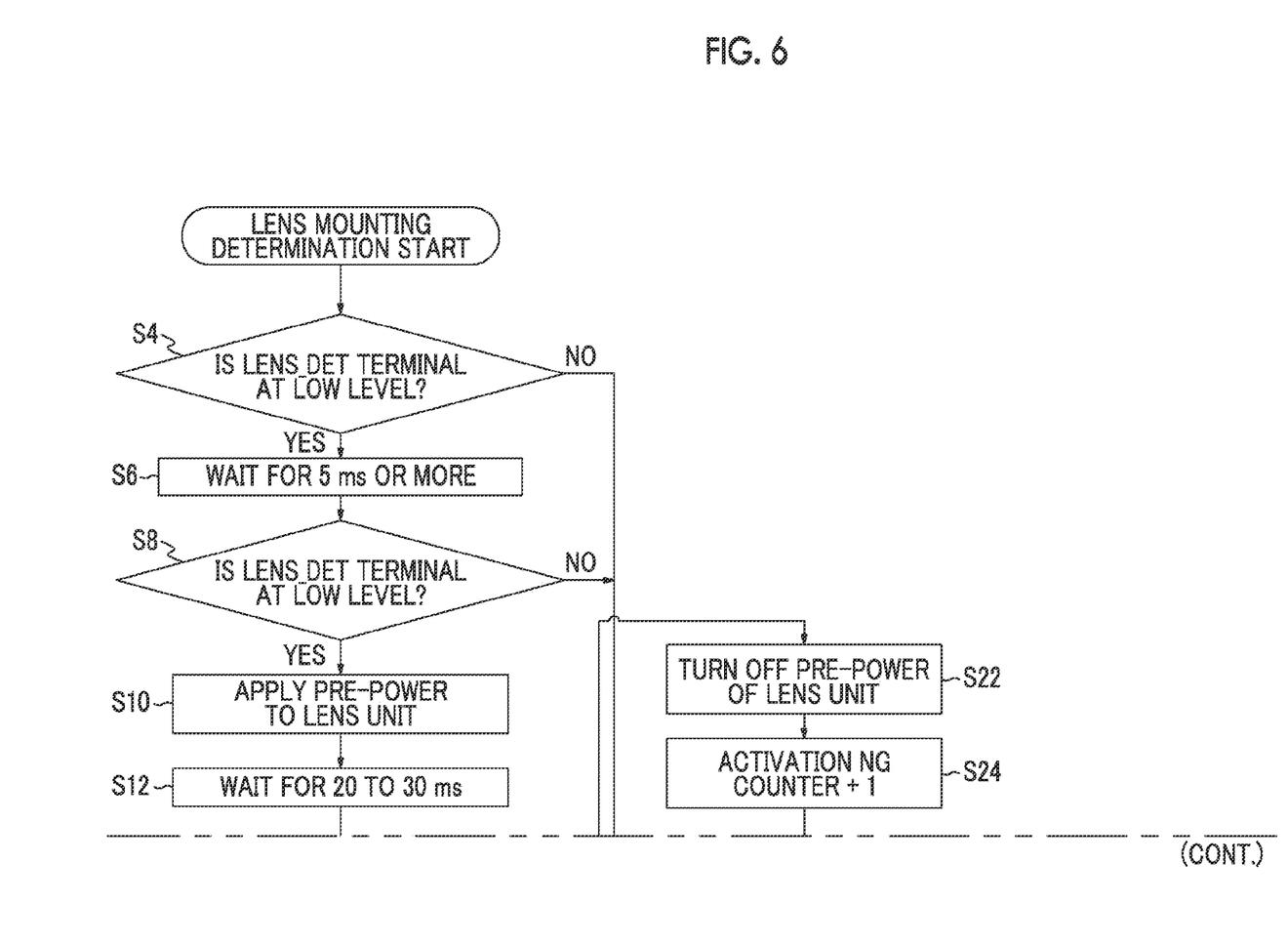
FIG. 6 is a flowchart illustrating an example of a lens mounting determination process after activation of the camera body.

FIG. 6 is a flowchart illustrating an example of a lens mounting determination process after activation of the camera body 200. The lens mounting determination process is performed in accordance with the program by the body CPU 220 of the camera body 200. Hereinafter, referring to FIG. 6, an example of the lens mounting determination process after the activation of the camera body 200 will be described.

Hereinafter, the difference point from the flowchart (the lens mounting determination process when the power of the camera body 200 is turned on) of FIG. 5 will be described.

Steps S4 to S26 of FIG. 6 is the same as the steps of FIG. 5.

In step S26, when the activation NG counter is equal to or less than the threshold value, the process advances to the sequence of lens power off (step S34).

The process flow (steps S30 to S36) in a case where the activation NG counter is greater than that in step S26 is the same as that of FIG. 5.

That is, the lens mounting determination process after the activation of the camera body 200 corresponds to the flow of the process in which steps S2 and S28 of FIG. 5 are omitted.

In addition, when the LENS_DET terminal on the camera body 200 side is at the high level or is changed from the low level to the high level, the body CPU 220 of the camera body 200 determines that the lens unit 100 is not mounted, regardless of whether the MT_MOSI signal terminal is at the high level or the low level.

In the above description of the example, the interchangeable lens camera is an interchangeable lens camera (mirrorless single-lens camera) in which the reflection mirror is omitted. However, the present invention can also be applied to an interchangeable lens camera having a reflection mirror. Further, in the above description of the example, the imaging device is provided in the camera body. However, the present invention can also be applied to a case where the imaging device is provided in the lens unit.

Among the plurality of signal terminals (body-side signal terminals) for communication of the camera body 200 side and the plurality of signal terminals (lens-side signal terminals) for communication of the lens unit 100 side, the terminal used in the lens mounting determination is not particularly limited to the MT_MOSI signal terminal shown in FIG. 3. The following terminals may be used: the terminal (INTR_BUSY signal terminal) of the busy signal indicating the specific operation time period of at least one of the camera body 200 and the lens unit 100; the terminal (VSYNC signal terminal) of the signal of synchronization between the camera body 200 and the lens unit 100; and the signal terminal (MT_SIMO signal terminal) for serial communication between the camera body 200 and the lens unit 100. In this case, the pull-up resistor R2 is connected to the signal terminal used in the lens mounting determination of the camera body side, and the pull-down resistor R4 is connected to the signal terminal used in the lens mounting determination of the lens unit side.

It is apparent that the present invention is not limited to the examples described in the present specification and the examples shown in drawings, and various design variations and modifications may be made without departing from the scope of the present invention.

What is claimed is:

1. An interchangeable lens camera comprising a camera body and a lens unit,
the camera body comprising:
a power supply;
a body-side mount section configured to detachably mount the lens unit, the body-side mount section being provided with a body-side power supply terminal connected to the power supply, a body-side detection terminal dedicated to detection of the lens unit, and a plurality of body-side signal terminals for communication with the lens unit;
a mounting determination section configured to determine whether the lens unit is mounted on the body-side mount section;
a body-side communication section configured to communicate with the lens unit through the plurality of body-side signal terminals of the body-side mount section; and
a body control section configured to control the camera body,
the lens unit comprising:
a lens-side mount section being provided with a lens-side power supply terminal capable of coming into contact with the body-side power supply terminal of the camera body, a lens-side detection terminal capable of coming into contact with the body-side detection terminal of the body, and a plurality of lens-side signal terminals capable of respectively coming into contact with the plurality of body-side signal terminals of the camera body; and
a lens-side communication section configured to communicate with the camera body through the plurality of lens-side signal terminals of the lens-side mount section,
wherein a specific body-side signal terminal among the plurality of body-side signal terminals of the camera body is connected to the power supply through a pull-up resistor, and a specific lens-side signal terminal, which is capable of coming into contact with the specific body-side signal terminal, among the plurality of lens-side signal terminals of the lens unit is grounded through a pull-down resistor, and
wherein the mounting determination section of the camera body determines that the lens unit is mounted on the body-side mount section when resistance values of both the specific body-side signal terminal at time of non-communication and the body-side detection terminal of the camera body are at low levels.

2. The interchangeable lens camera according to claim 1, wherein before power is applied to the lens unit through the body-side power supply terminal of the body-side mount section, the mounting determination section of the camera body sets only the body-side detection terminal as a determination target and determines whether or not the resistance value of the body-side detection terminal is at the low level,
and in a case where the mounting determination section of the camera body determines that the resistance value of the body-side detection terminal is at the low level, the mounting determination section determines whether or not the resistance values of both the body-side detection terminal and the specific body-side signal terminal at the time of non-communication are at the low levels after power is applied to the lens unit through the body-side power supply terminal of the body-side mount section.

3. The interchangeable lens camera according to claim 2, wherein the body control section of the camera body applies pre-power to supply weak current to the lens unit through the body-side power supply terminal of the body-side mount section, and applies main power to supply current capable of operating the lens unit to the lens unit through the body-side power supply terminal of the body-side mount section in the case where the mounting determination section of the camera body determines that both resistance values of the body-side detection terminal and the specific body-side signal terminal at the time of non-communication are at the low levels, and
wherein the body control section of the camera body stops supplying the weak current to the lens unit in the case where the mounting determination section of the camera body determines that the resistance value of the body-side detection terminal or the specific body-side signal terminal at the time of non-communication is at a high level, which is higher than the low level.

4. The interchangeable lens camera according to claim 1, wherein at least one body-side signal terminal is disposed between the body-side power supply terminal and the specific body-side signal terminal of the body-side mount section of the camera body.

5. The interchangeable lens camera according to claim 2, wherein at least one body-side signal terminal is disposed between the body-side power supply terminal and the specific body-side signal terminal of the body-side mount section of the camera body.

6. The interchangeable lens camera according to claim 3, wherein at least one body-side signal terminal is disposed between the body-side power supply terminal and the specific body-side signal terminal of the body-side mount section of the camera body.

7. The interchangeable lens camera according to claim 1, wherein at least one body-side signal terminal is disposed between a body-side ground terminal and the specific body-side signal terminal of the body-side mount section of the camera body.

8. The interchangeable lens camera according to claim 2, wherein at least one body-side signal terminal is disposed between a body-side ground terminal and the specific body-side signal terminal of the body-side mount section of the camera body.

9. The interchangeable lens camera according to claim 3, wherein at least one body-side signal terminal is disposed between a body-side ground terminal and the specific body-side signal terminal of the body-side mount section of the camera body.

10. The interchangeable lens camera according to claim 4, wherein at least one body-side signal terminal is disposed between a body-side ground terminal and the specific body-side signal terminal of the body-side mount section of the camera body.

11. The interchangeable lens camera according to claim 7, wherein the mounting determination section determines that the lens unit is mounted in the case where the resistance values of both the specific body-side signal terminal at the time of non-communication and the body-side detection terminal of the camera body are at the low levels, and a resistance value of a signal terminal disposed between the body-side ground terminal and the specific body-side signal terminal of the camera body is at the high level.

12. The interchangeable lens camera according to claim 1, wherein the mounting determination section determines that the lens unit is mounted in the case where the resistance values of both the specific body-side signal terminal at the time of non-communication and the body-side detection terminal of the camera body are at the low levels, and a resistance value of a signal terminal adjacent to the body-side ground terminal of the camera body is at the high level.

13. The interchangeable lens camera according to claim 1, wherein at least one body-side signal terminal is disposed between the body-side detection terminal and the specific body-side signal terminal of the body-side mount section of the camera body.

14. The interchangeable lens camera according to claim 13, wherein the mounting determination section determines that the lens unit is mounted in the case where resistance values of both the specific body-side signal terminal at the time of non-communication and the body-side detection terminal of the camera body are at the low levels and a resistance value of a signal terminal disposed between the body-side detection terminal and the specific body-side signal terminal of the camera body is at the high level.

15. The interchangeable lens camera according to claim 1, wherein the mounting determination section determines that the lens unit is mounted in the case where the resistance values of both the specific body-side signal terminal at the time of non-communication and the body-side detection terminal of the camera body are at the low levels and a resistance value of a signal terminal adjacent to the body-side detection terminal of the camera body is at the high level.

16. The interchangeable lens camera according to claim 1 wherein the mounting determination section determines that the lens unit is mounted in the case where the resistance values of both the specific body-side signal terminal at the time of non-communication and the body-side detection terminal of the camera body are at the low levels and a resistance value of a signal terminal adjacent to the specific body-side signal terminal is at the high level.

17. The interchangeable lens camera according to claim 1, wherein the plurality of lens-side signal terminals and the plurality of body-side signal terminals for communication include at least one of a terminal for a busy signal indicating a specific operation time period of at least one of the camera body and the lens unit, a terminal for a synchronization signal for synchronization between the camera body and the lens unit, a terminal for a serial communication signal for serial communication between the camera body and the lens unit, and a terminal for a parallel communication signal for parallel communication between the camera body and the lens unit.

18. The interchangeable lens camera according to claim 1, wherein the mounting determination section of the camera body determines that the lens unit is not mounted, regardless of whether the resistance value of the specific body-side signal terminal is at the high level or at the low level, when the resistance value of the body-side detection terminal is at the high level or when the resistance value of the body-side detection terminal is switched from the low level to the high level.

19. The camera body constituting the interchangeable lens camera according to claim 1.

20. A lens mounting determination method of determining whether or not a lens unit detachable from a camera body is mounted on the camera body,
wherein the camera body comprises:
a power supply;
a body-side mount section configured to detachably mount the lens unit, the body-side mount section being provided with a body-side power supply terminal connected to the power supply, a body-side detection terminal dedicated to detection of the lens unit, and a plurality of body-side signal terminals for communication with the lens unit; and
a body-side communication section configured to communicate with the lens unit through the plurality of body-side signal terminals of the body-side mount section,
wherein the lens unit comprises:
a lens-side mount section being provided with a lens-side power supply terminal capable of coming into contact with the body-side power supply terminal of the camera body, a lens-side detection terminal capable of coming into contact with the body-side detection terminal of the camera body, and a plurality of lens-side signal terminals capable of respectively coining into contact with the plurality of body-side signal terminals of the camera body; and
a lens-side communication section configured to communicate with the camera body through the plurality of lens-side signal terminals of the lens-side mount section,
wherein a specific body-side signal terminal among the plurality of body-side signal terminals of the camera body is connected to the power supply through a pull-up resistor, and a specific lens-side signal terminal, which is capable of coming into contact with the specific body-side signal terminal, among the plurality of lens-side signal terminals of the lens unit is grounded through a pull-down resistor,
the lens mounting determination method comprising determining that the lens unit is mounted on the body-side mount section when resistance values of both the specific body-side signal terminal at the time of non-communication and the body-side detection terminal of the camera body are at low levels.

* * * * *